Nov. 5, 1968                R. J. BOGNER ETAL                3,409,117
                              CONVEYOR SYSTEM
Filed Aug. 30, 1966                                      2 Sheets-Sheet 1
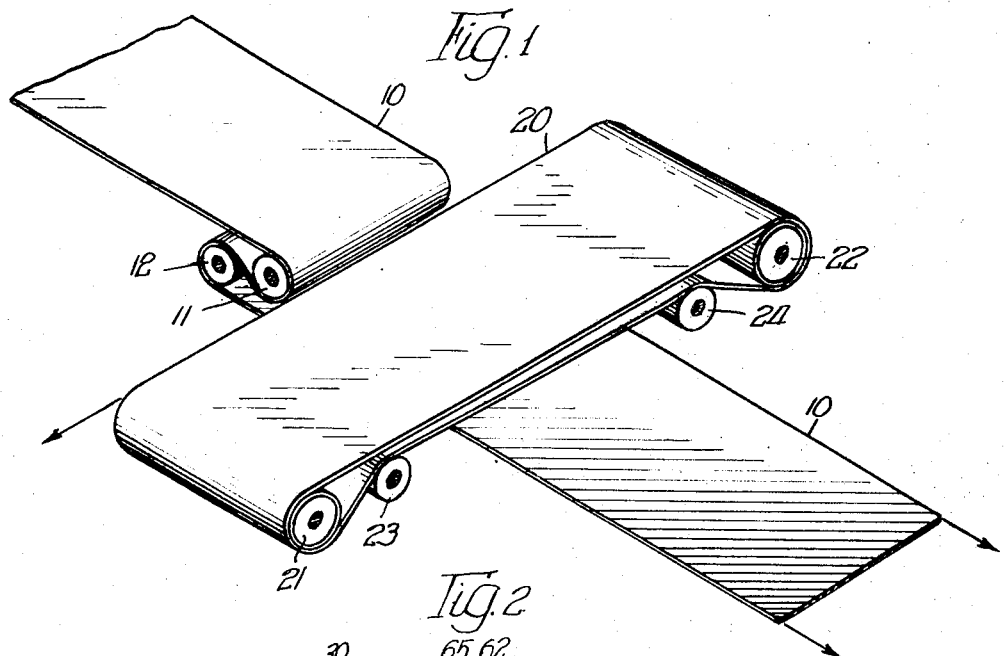
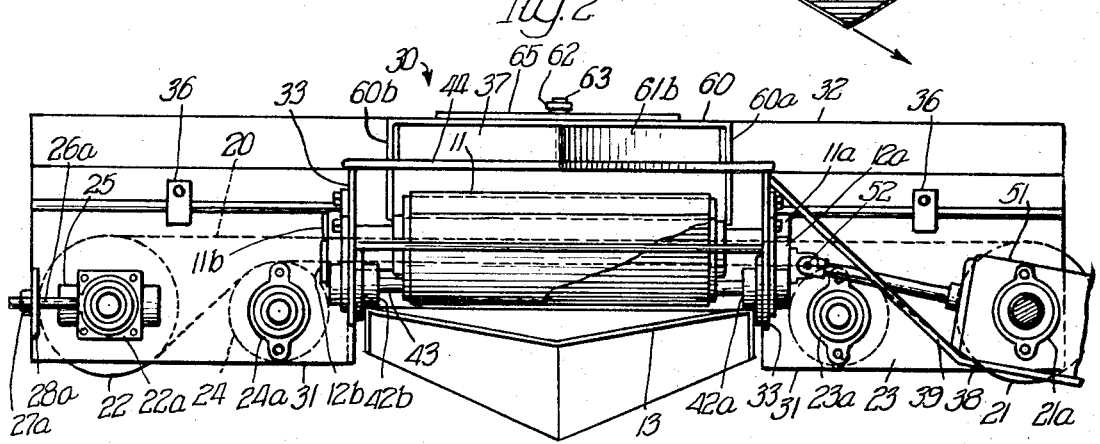
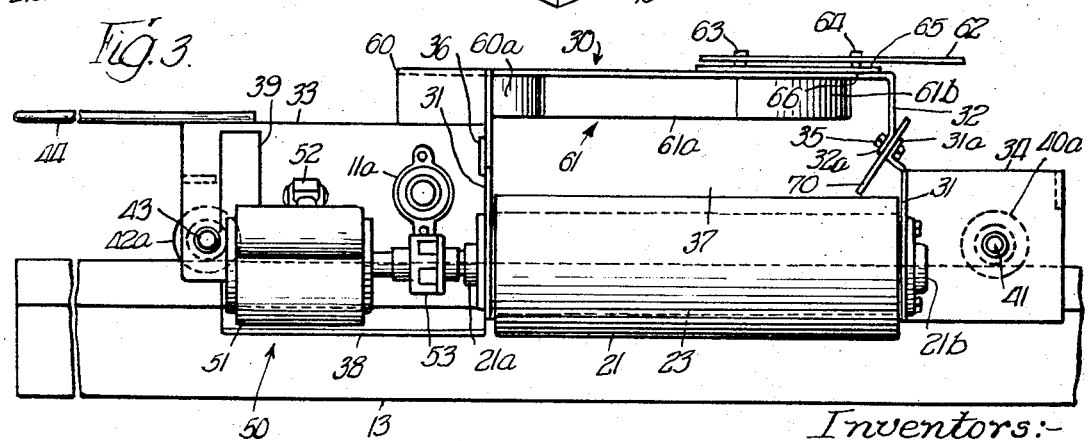
Inventors:-
Richard J. Bogner,
Ralph N. Massey,
By Hume, Groen, Clement & Hume Attys.

Nov. 5, 1968     R. J. BOGNER ETAL     3,409,117
CONVEYOR SYSTEM
Filed Aug. 30, 1966     2 Sheets-Sheet 2
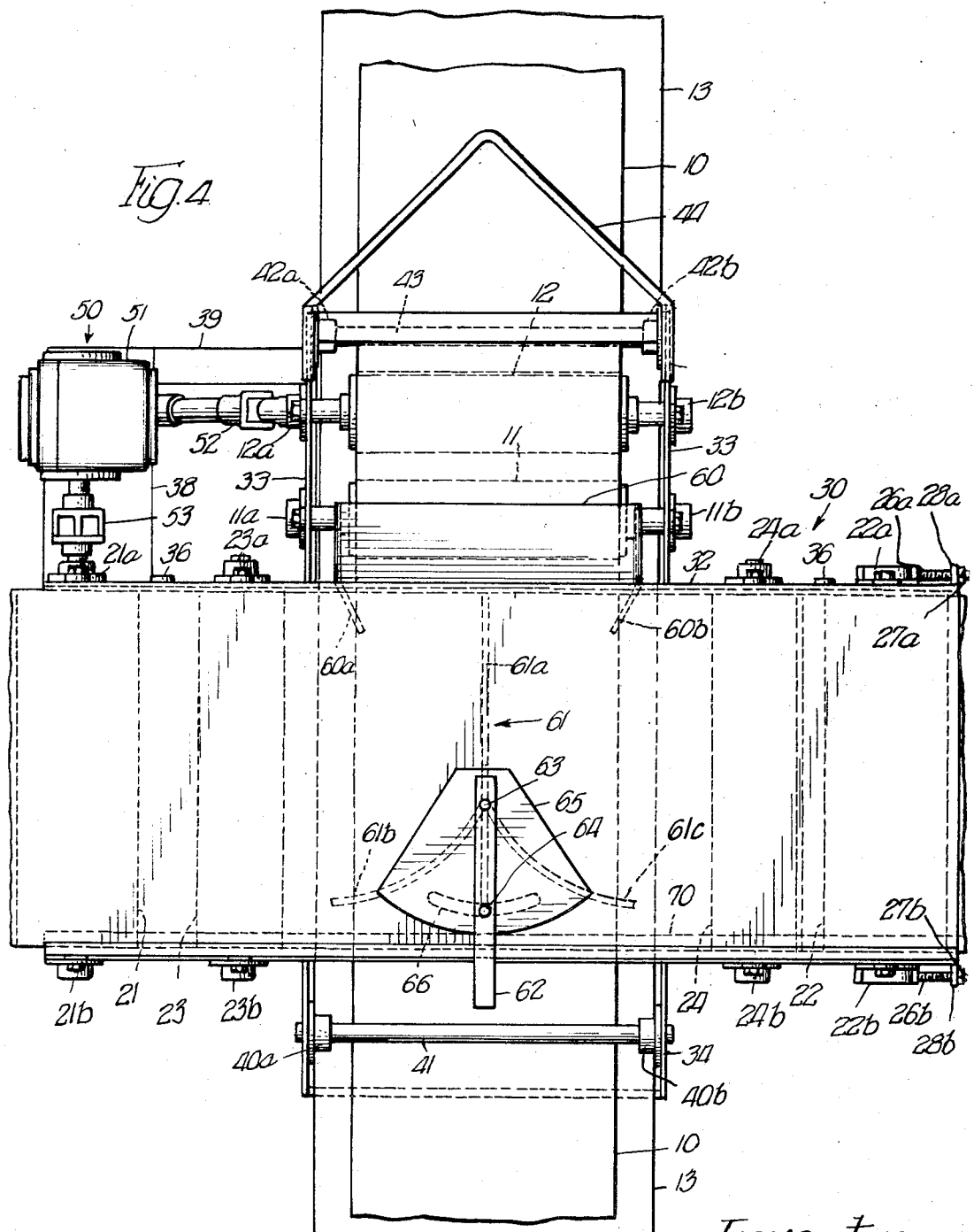
Inventors:-
Richard J. Bogner,
Ralph N. Massey,
By Hume, Groen, Clement & Hume
Attys.

United States Patent Office 3,409,117
Patented Nov. 5, 1968

3,409,117
CONVEYOR SYSTEM
Richard J. Bogner, Dodge City, and Ralph N. Massey, Ensign, Kans., assignors to Speed King Manufacturing Company, Incorporated, Dodge City, Kans., a corporation of Kansas
Filed Aug. 30, 1966, Ser. No. 576,031
3 Claims. (Cl. 198—76)

ABSTRACT OF THE DISCLOSURE

A conveyor system, wherein a discharge assembly is mounted on a main conveyor structure for movement therealong. The discharge assembly defines a transfer enclosure, through which passes a reversibly driven slinger belt transversely to the main conveyor belt. Material entering the transfer enclosure on the main belt is tripped off onto the slinger belt, and is forcefully ejected from the transfer enclosure at right angles to the main belt. Deflector means and means for varying the slinger belt speed may be provided to control the lateral range of discharge.

---

This invention relates to conveyor systems for handling aggregate materials (e.g., grain, coal, gravel, and similar discrete fungibles) and, more particularly, to a conveyor system in which material from a main stream may be discharged at any desired point along either side of the main stream.

The present invention is directed to a series of problems often encountered in connection with the transportation, storage, and distribution of materials such as grain, which are admirably suited to handling with conveyor systems. As a typical example, one might use an endless belt type conveyor to transport grain from an unloading point into a warehouse for storage. In such a circumstance, the grain would simply be unloaded from a truck or other carrier onto one end of the conveyor belt and would be carried by the belt until it reached the other end where it would be discharged. It should be apparent, however, that such a system would require either frequent moving of the discharge end of the conveyor belt, or spreading of the grain as it piles up. Neither of these alternatives is very satisfactory since conveyors are typically unwieldly and relatively difficult to move, and manual spreading of the grain requires additional manpower and time. Accordingly, it is desirable to provide a system wherein the grain can be discharged at any desired point along the length of the conveyor.

A number of such systems have been proposed, but none has achieved the necessary flexibility, speed of operation, portability, compactness, and simplicity of design to be really practicable for the rapid efficient handling of small aggregates such as grain.

It is therefore an object of this invention to provide a conveyor system wherein material from a main stream can readily be discharged at any point along either side of the main stream.

It is a further object of this invention to provide a conveyor system for selective distribution of aggregate materials which eliminates the necessity for manual leveling or further handling of the material in a storage or other discharge area.

It is also an object of this invention to provide a conveyor system for selective distribution of aggregate materials, which system is characterized by simplicity of design, portability, ease of operation and low cost.

It is another object of this invention to provide a conveyor system which can be quickly dismantled and transported from place to place for use in a variety of locations and applications.

It is still a further object of this invention to provide a conveyor system wherein a main conveyor and a discharge assembly function as a coordinated unit and are operated by a single power source.

Another object of this invention is to provide a conveyor system wherein the lateral range of discharge on either side of a main conveyor can be effectively controlled.

In order to achieve the foregoing and other objects, the present invention has as its principal structural features a main conveyor in combination with a secondary conveyor arranged at right angles to said main conveyor. The secondary conveyor is mounted for movement along the length of the main conveyor and is adapted to receive the stream of material carried by said main conveyor at any desired point along said main conveyor. The secondary conveyor is moved along the main conveyor either manually or automatically. The material may be discharged from the secondary conveyor on either side of the main conveyor. Power for driving the secondary conveyor may be derived from the main conveyor, or, alternatively, both conveyors may be driven from a single source at a single point or separate sources. Adjustable deflection means and speed control may be provided to enable a control over the range of discharge from the sides of the main conveyor.

The foregoing features and objects, as well as others, will be more fully understood when considered in light of the balance of the specification and the claims, with particular reference to the following drawings, in which:

FIGURE 1 depicts a schematic representation of an arrangement of rollers and conveyor belts, which arrangement constitutes one aspect of a conveyor system embodying the invention;

FIGURE 2 is a front elevational view, partially broken away, of a conveyor system embodying the invention;

FIGURE 3 is a side elevational view of the conveyor system shown in FIGURE 2; and FIGURE 4 is a top view of the system of FIGURE 2.

Referring specifically to the drawings, FIGURE 1 is a schematic representation of the arrangement of belts and rollers within the conveyor system. As shown therein, an endless conveyor belt 10 passes over and around a transfer roller 11 and then over and around a power takeoff roller 12. The conveyor belt 10 may be assumed to be traveling in the direction shown by the arrows. Disposed transversely to the conveyor belt 10 and slightly below the transfer roller 11 is a slinger belt 20. The slinger belt 20 is endless, and is looped about a pair of drive rollers 21 and 22. The lower loop of the slinger belt 20 is supported by a pair of support rollers 23 and 24 so that it avoids contact with the conveyor belt 10. The slinger belt 20 may travel in either direction transversely to the conveyor belt 10, but in FIGURE 1 it is assumed to be traveling in the direction shown by the arrow. Incoming material on the conveyor belt 10 is tripped off as the conveyor belt passes around the transfer roller 11, and the material falls onto the slinger belt 20, where it is transported transversely to the direction of the conveyor belt and is ultimately slung off as the slinger belt passes around the drive roller 21.

FIGURES 2, 3 and 4 show the structural features of the invention in more detail. In FIGURE 2 there is shown a discharge assembly, generally designated by the numeral 30, in combination with a conveyor structure 13. In general, the discharge assembly 30 includes a slinger support frame 31, a cover 32 and, as best seen in FIGURES 3 and 4, a conveyor support frame 33 and a rear wheel support frame 34. As is most clearly shown in FIGURE 3, the cover 32 is secured to the slinger support frame 31 by means of bolts 35 and retainer tabs 36, and the cover and the slinger support frame are arranged to define a transfer enclosure 37.

With specific reference to FIGURE 4, the transfer roller 11 and the power takeoff roller 12 are supported by journal boxes 11a and 11b, and 12a and 12b, respectively. The journal boxes 11a, 11b, 12a and 12b are bolted to the conveyor support frame 33. In like manner, the support rollers 23 and 24 are supported by journal boxes 23a and 23b, and 24a and 24b, respectively, which are in turn bolted to the slinger support frame 31. Similarly, the drive roller 21 is supported by journal boxes 21a and 21b which are also bolted to the slinger support frame 31. The drive roller 22 is supported by a pair of moveable journal boxes 22a and 22b. The moveable journal boxes 22a and 22b are disposed for limited horizontal movement in slots 25 formed in the slinger support frame 31, so as to provide a means for adjusting the tension of the slinger belt 20. A pair of bolts 26a and 26b are attached to the moveable journal boxes 22a and 22b respectively, and are threaded through adjusting nuts 27a and 27b resting against stop members 28a and 28b, which latter are attached to the ends of the slinger support frame 31.

A pair of rear wheels 40a and 40b are attached to an axle 41. The axle 41 is journaled at each end into the rear wheel support frame 34. The wheels 40a and 40b ride on the edges of the conveyor structure 13.

At the front end of the discharge assembly 30 is a similar pair of front wheels 42a and 42b attached to an axle 43. The axle 43 is likewise journaled at each end in the conveyor support frame 33, and the wheels 42a and 42b ride the edges of the conveyor structure 13.

A power takeoff assembly, generally designated by the numeral 50, is attached to a support plate 38 which is attached to the slinger support frame 31. A brace 39 is attached at one end to the support plate 38 and at the other end to the conveyor support frame 33. The power takeoff assembly comprises a gear box 51 which is connected to the power takeoff roller 12 through the journal box 12a by means of a universal coupling 52. The gear box 51 is also coupled to the drive roller 21 through the journal box 21a by a coupling 53.

Attached to the conveyor support frame 33 is a pull bar 44. Integral with the cover 32 is a guide channel 60 having a pair of inwardly angled legs 60a and 60b. Projecting downward into the transfer enclosure 37 from the top of the cover 32 is a deflector assembly 61 consisting of a divider strip 61a and a pair of arcuate arms 61b and 61c. The deflector assembly 61 is attached to a control lever 62 by means of a pair of bolts 63 and 64. Disposed on the top of the cover 32 is a bearing plate 65 through which the bolts 63 and 64 pass. The bolt 63 is pivotally secured to the cover 32 while the bolt 64 is free to move in an arcuate slot 66 formed in the cover.

At the point of connection between the cover 32 and the slinger support frame 31 is a flexible baffle 70. The baffle 70 is disposed between the angled portions 31a and 32a of the slinger support frame 31 and the cover 32, respectively, and projects downwardly into the transfer enclosure 37, ultimately contacting the slinger belt 20. The baffle 70 may be fabricated from leather, rubber or similar flexible material.

The operation of the conveyor system may now be described. The conveyor belt 10, which is preferably of the flexible V-trough type, can be driven by a power source (not shown) at a point remote from the discharge assembly 30, in which case the power for driving the slinger belt 20 is extracted from the power takeoff roller 12 by by means of the power takeoff assembly 50.

The gear box 51 preferably includes a selective reverse gearing arrangement (operating mechanism not shown) so that the direction of rotation of the slinger drive roller 21 can be reversed. In this manner, the direction of travel of the slinger belt 20 can be reversed and material can thus be discharged on either side of the conveyor structure 13. The gear box 51 also may include a variable speed gearing arrangement so that the speed of the slinger belt 20 may be varied. This latter feature would provide a control over the lateral range of discharge, since the material will be discharged more forcefully with increased slinger belt speed.

As indicated above, the discharge assembly 30 is mounted for movement along the length of the conveyor structure 13. The discharge structure 30 can be made to roll quite freely on the wheels 40a, 40b, 42a, and 42b along the edges of the conveyor structure 13, and by using the pull bar 44, a single operator can easily move the discharge structure to any desired point along the length of the conveyor structure. In this manner the conveyed material can be discharged at any point on either side of the conveyor structure 13 or evenly distributed therealong, as desired.

The discharge assembly 30 can also be made to travel along the length of the conveyor structure 13 automatically by employing, for example, a rack and pinion mechanism or worm gear assembly. In such case, motive power could be extracted from one of the rollers, or from the power takeoff assembly 50.

A further degree of control over the lateral discharge range of the material slung off the slinger belt 20 may be had by suitable manipulation of the deflector assembly 61. It will be noted from FIGURE 4 that as the conveyed material enters the transfer enclosure 37, the guide channel 60 with its inwardly angled legs 60a and 60b tends to guide the material toward the center of the enclosure. When the deflector assembly 61 is in the position shown in FIGURE 4, the deflection is essentially neutral, in that the material tends to strike the arcuate arms 61b and 61c and fall to the slinger belt 20 on either side of the divider strip 61a. However, if for example the control lever 62 is moved to the left, the divider strip 61a is positioned near the guide leg 60b, and the incoming material tends to be completely deflected toward the left of the transfer enclosure 37. It should be apparent from this, assuming that the slinger belt 20 is moving to the left, that the material will be slung from the left side of the discharge assembly 30 with much greater force than if the deflector assembly 61 is in a neutral position. Thus the lateral range of discharge can also be quite effectively controlled by proper manipulation of the deflector assembly 61.

The baffle 70 provides a stop for any material which fails to contact the deflector arms 61b and 61c. This prevents material from missing the slinger belt 20 altogether and falling down to be carried out of the discharge assembly 30 by the conveyor belt 10, and also prevents material from falling off the slinger belt.

It should be clear from the foregoing that the present invention provides a very flexible and efficient system for the handling and distribution of aggregate materials. The system is particularly suitable for the handling of smaller aggregates, such as grain, since it is capable of very high speed operation without spillage due to the arrangement of the deflector assembly 61 and the baffle 70. The reversibility of the slinger belt 20 and the ease with which the discharge assembly 30 may be moved along the conveyor structure 13, together with the range control provided by the deflector assembly 61, makes possible the absolute control of discharge and distribution within a reasonable distance on either side and along the entire length of the conveyor structure. The power takeoff assembly 50 eliminates the necessity for dual power sources, and thus materially reduces the cost and complication of the system. Although admirably suited to grain and other lightweight aggregates, the system will also provide excellent distribution of heavier materials, such as coal and gravel, limited only by the durability of the belts 10 and 20 and the metals from which the components of the discharge assembly 30 are fabricated.

Since the system is quite compact in design and is relatively lightweight, it can be made to be very portable.

By constructing the conveyor structure 13 in sections, the entire system can be transported by truck and set up wherever needed.

Although the invention has been described with the requisite particularity, the disclosure is of course only exemplary. Consequently, numerous changes in the details of construction and the size, configuration, and arrangement of components and the selection of materials will be apparent to those familiar with the art, and may be resorted to without departing from the scope of the invention as set forth in the following claims.

What is claimed is:

1. A conveyor system including, in combination, a main conveyor structure; a conveyor belt carried by said main structure for transporting a stream of material; drive means for said conveyor belt; a frame mounted upon said main structure for movement along the length thereof, said frame defining a transfer enclosure with discharge openings through which said stream of material may be discharged laterally on either side of said main structure; first roller means carried by said frame for elevating said conveyor belt to provide a vertical step therein, whereby said conveyor belt enters said transfer enclosure in a loaded condition at an upper vertical level and leaves said transfer enclosure in an unloaded condition at a lower vertical level; a slinger belt passing through said transfer enclosure transversely to said conveyor belt and disposed proximate said vertical step above said lower level and below said upper level so as to receive said stream of material from said conveyor belt as said conveyor belt passes over said vertical step and to discharge said stream of material through one of said discharge openings; second roller means carried by said frame for supporting and driving said slinger belt; means for driving said second roller means; deflector means pivotally attached to the top of said frame and projecting downwardly therefrom into said transfer enclosure for providing variable deflection of said stream of material entering said transfer enclosure.

2. A conveyor system as defined in claim 1, wherein said deflector means comprises a divider strip, a pair of arcuate arms, and a lever for pivoting said divider strip, said arms being rigidly attached centrally of said divider strip and projecting one on each side thereof, said divider strip and arms being oriented such that when said divider strip is positioned substantially parallel to the direction of travel of said conveyor the concave surfaces of said arms are presented toward said stream of material entering said transfer enclosure from said upper level of said conveyor and the free ends of said arms are directed toward said discharge openings.

3. In a conveyor system, which system includes a main conveyor structure, a conveyor belt carried by said main structure for transporting a stream of material, and drive means for said conveyor belt, the combination thereof with a discharge assembly comprising:

a wheeled frame mounted upon said main structure and movable along the length thereof, said frame defining a transfer enclosure with discharge openings through which said stream of material may be discharged laterally on either side of said main structure;

first roller means carried by said frame for elevating said conveyor belt to provide a vertical step therein, whereby said conveyor belt enters said transfer enclosure in a loaded condition at an upper vertical level and leaves said transfer enclosure in an unloaded condition at a lower vertical level, said first roller means including a driven roller adapted to be rotated by the movement of said conveyor belt;

a slinger belt passing through said transfer enclosure transverse to said conveyor belt and disposed proximate said vertical step above said lower level and below said upper level so as to receive said stream of material from said conveyor belt as said conveyor belt passes over said vertical step and to discharge said stream of material through one of said discharge openings;

second roller means carried by said frame for supporting and driving said slinger belt;

power takeoff means for deriving rotary motion from said driven roller and transmitting said rotary motion to said second roller means to drive said slinger belt, said power takeoff means including a selective reverse gearing arrangement capable of driving said second roller means in either a forward or a reverse direction, whereby said stream of material may be selectively discharged through either of said discharge openings;

deflector means pivotally attached to the top of said frame and projecting therefrom downwardly into said transfer enclosure for providing variable deflection of said stream of material entering said transfer enclosure;

and a flexible baffle member attached to the rear of said frame and projecting therefrom downwardly and inwardly into said transfer enclosure to contact said slinger belt.

References Cited

UNITED STATES PATENTS

| 235,128 | 12/1880 | Cook | 198—68 X |
| 741,447 | 10/1903 | Blaisdell | 198—97 |
| 1,403,921 | 1/1922 | Stuart | 198—186 |
| 1,585,694 | 5/1926 | Schoew | 198—186 |
| 1,714,032 | 5/1929 | Liggett | 198—186 |
| 752,838 | 2/1904 | Heintz | 198—76 |

FOREIGN PATENTS

| 1,103,234 | 3/1961 | Germany. |

EVON C. BLUNK, *Primary Examiner.*

R. J. HICKEY, *Assistant Examiner.*